(12) United States Patent
Pålsson

(10) Patent No.: US 6,585,298 B2
(45) Date of Patent: Jul. 1, 2003

(54) HIGH-STRENGTH BUTT-WRAP JOINT FOR REINFORCED PLASTIC PIPES

(75) Inventor: Gudmundur Pålsson, Sandefjord (NO)

(73) Assignee: Flowtite Technology AS, Sandefjord (NO)

( * ) Notice: Subject to any disclaimer, the term of this patent is extended or adjusted under 35 U.S.C. 154(b) by 0 days.

(21) Appl. No.: 09/986,939

(22) Filed: Nov. 13, 2001

(65) Prior Publication Data

US 2003/0090108 A1 May 15, 2003

(51) Int. Cl.$^7$ ................................. F16L 31/00
(52) U.S. Cl. .................. 285/294.2; 285/423; 285/369
(58) Field of Search ...................... 285/423, 294.2, 285/371, 369, 370, 398, 417

(56) References Cited

U.S. PATENT DOCUMENTS

| | | | | |
|---|---|---|---|---|
| 2,924,546 A | * | 2/1960 | Shaw | 156/94 |
| 2,930,406 A | * | 3/1960 | Galloway | 285/55 |
| 3,235,289 A | * | 2/1966 | Jones et al. | 285/21.2 |
| 3,467,412 A | * | 9/1969 | Gore et al. | 285/294.2 |
| 3,612,580 A | * | 10/1971 | Jones | 285/294.2 |
| 3,666,586 A | * | 5/1972 | Lacey | 156/98 |
| 4,257,630 A | * | 3/1981 | Bartell et al. | 285/21.2 |
| 4,549,752 A | * | 10/1985 | Nimke et al. | 285/55 |
| 4,559,974 A | * | 12/1985 | Fawley | 138/172 |
| 4,624,486 A | * | 11/1986 | Nishino et al. | 285/55 |
| 5,491,880 A | * | 2/1996 | Labiche | 29/402.09 |
| 6,336,983 B1 | * | 1/2002 | Fawley | 156/94 |

\* cited by examiner

Primary Examiner—Eric K. Nicholson
(74) Attorney, Agent, or Firm—Young & Thompson

(57) ABSTRACT

A butt-wrap joint includes a plurality of wraps $520_1$–$520_n$ of material wetted with a thermosetting resin and wrapped circumferentially about two abutting pipe ends 101, 201. The first wrap is disposed relative to the respective pipes and the second through n-th wrap is deposed successively outwardly, relative of the respective preceding wrap. The wraps are covered by a chopped strand mat 530 wetted with the thermosetting resin.

19 Claims, 6 Drawing Sheets

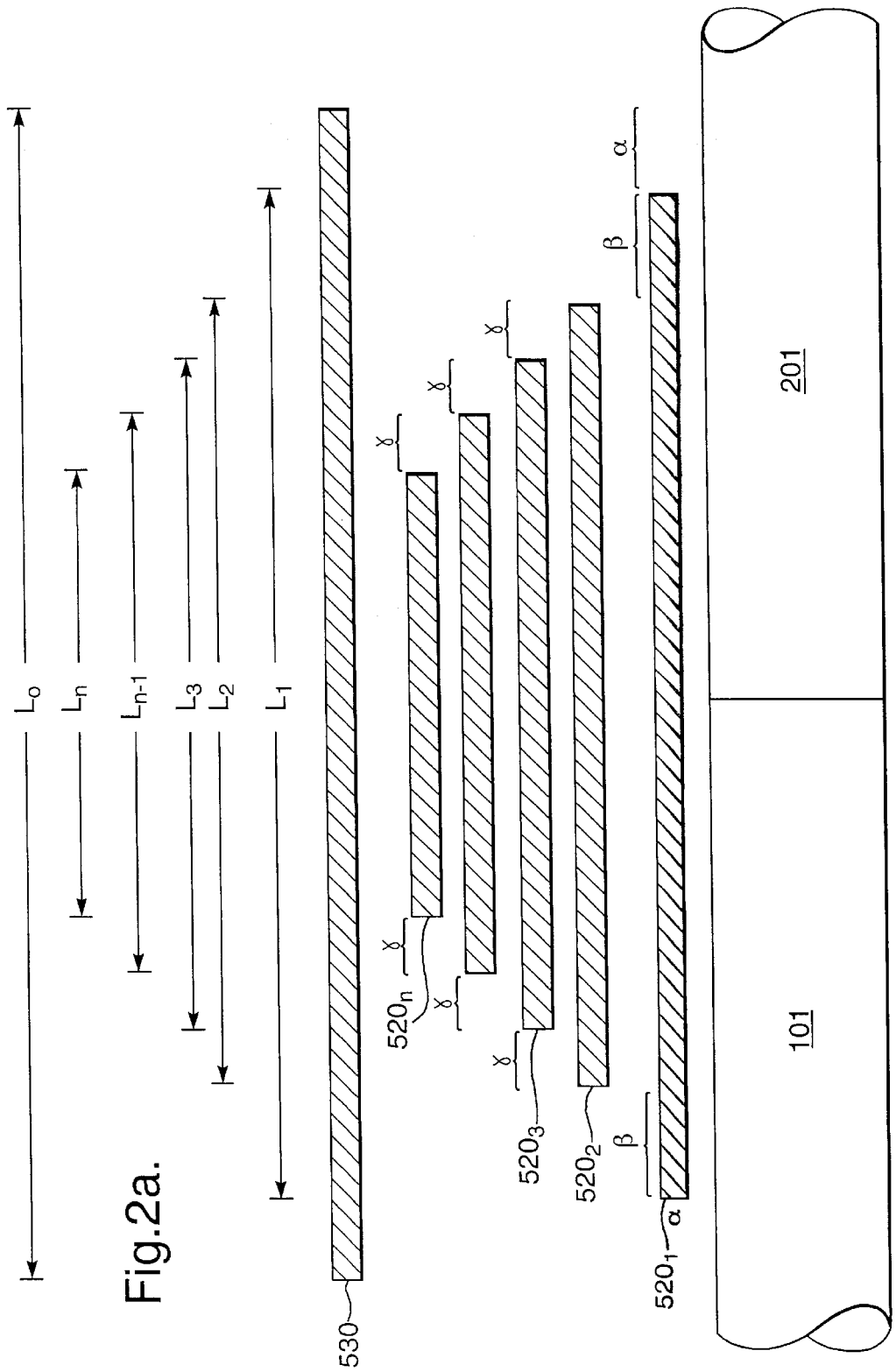

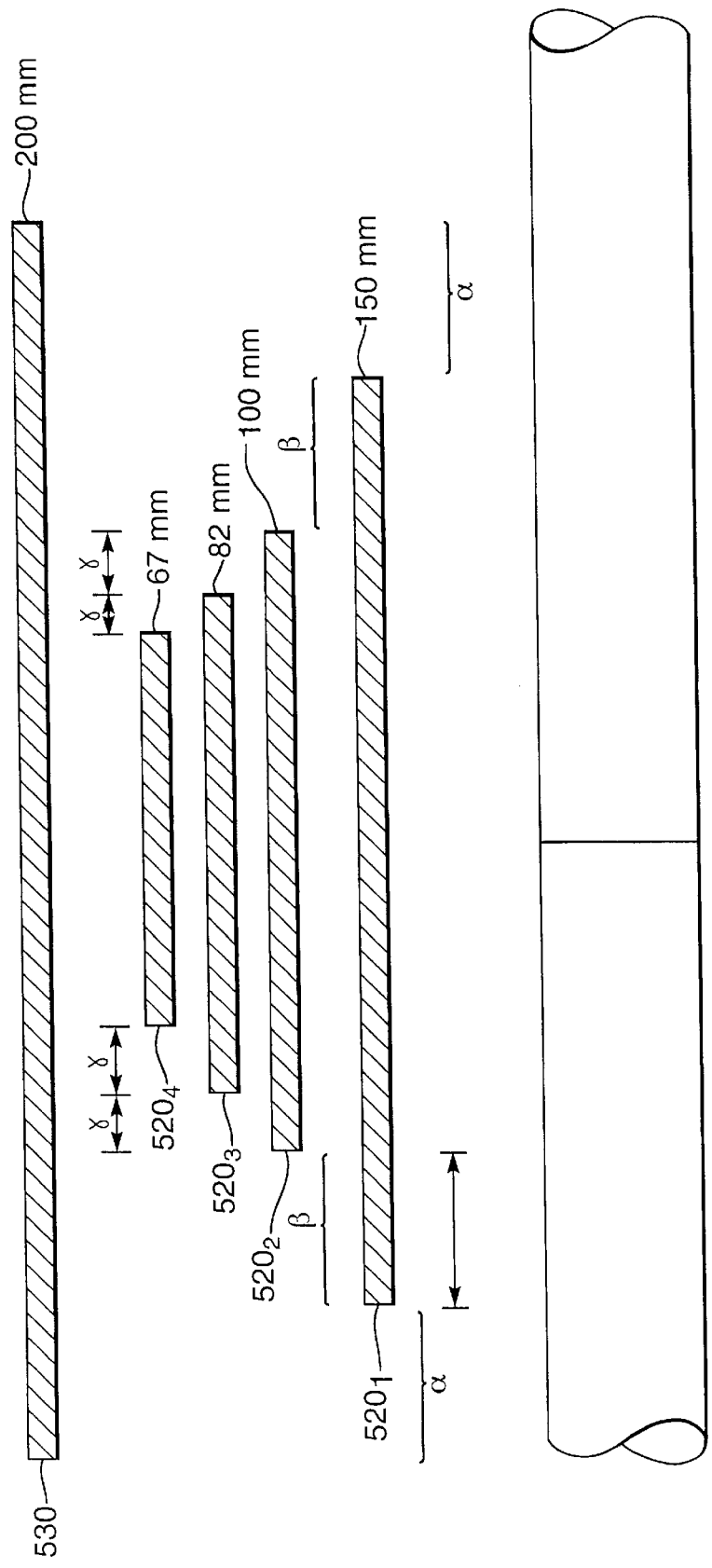

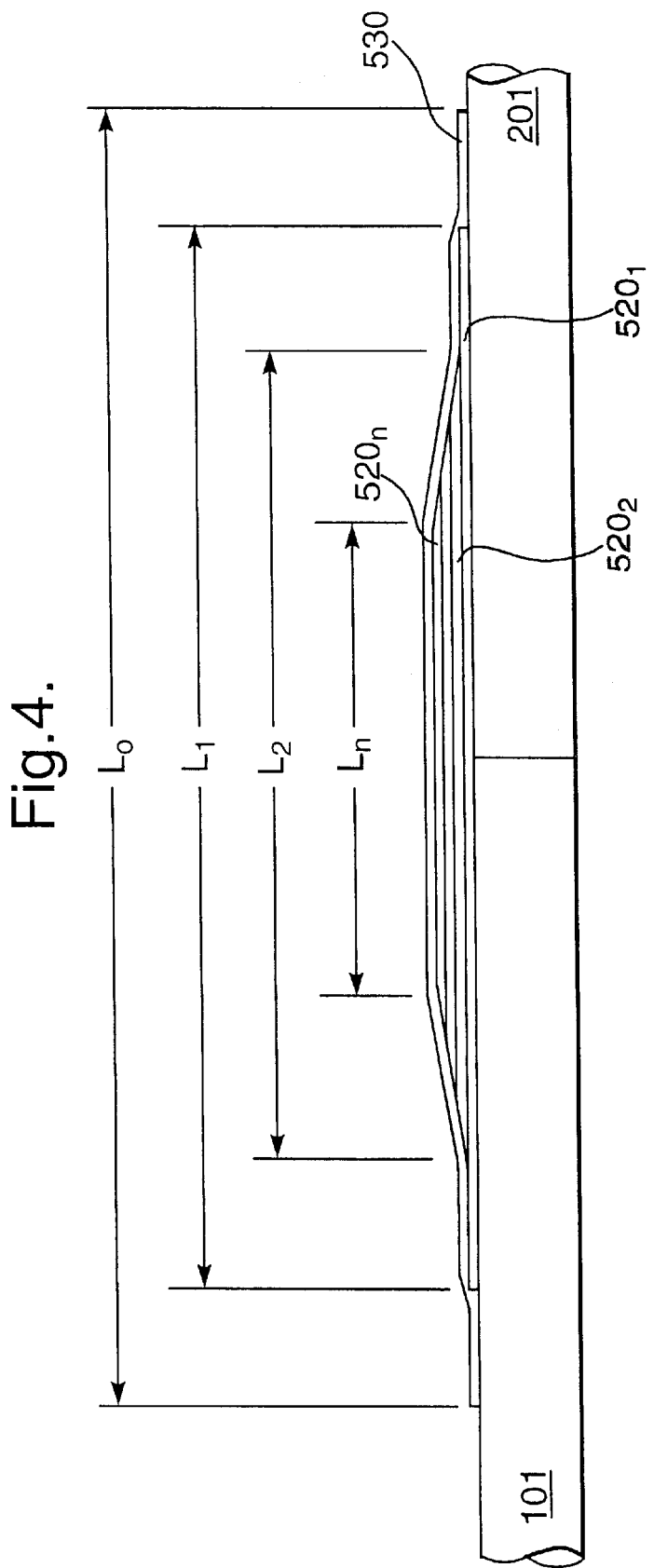

HIGH-STRENGTH BUTT-WRAP JOINT FOR REINFORCED PLASTIC PIPES

BACKGROUND OF THE INVENTION

1. Field of the Invention

This invention relates to the field of reinforced plastic pipes. More specifically, the invention relates to a butt-wrap (or butt-strap) joint between lengths of reinforced plastic pipes.

2. Description of the Related Art

GRP pipes are commonly joined by 'butt-wrap' (or 'butt-strap') joints, i.e. in an end-to-end (or edge-to-edge) configuration and wrapped with one or more wraps of fabric. The resulting laminate generally covers equal amounts of the two abutting pipe ends. The laminate typically consists of several wraps of reinforcement mats and/or woven rovings saturated with a thermosetting resin or other agent. The resin is cured by application of heat or by chemical means, thus changing the laminate into a substantially infusible and insoluble material (thermoset plastic). When curing, the laminate bonds with the pipe end outer walls, thus forming a joint with sufficient strenght in both the circumferential (hoop) and longitudinal directions.

Current butt-wrap technologies are based on the use of laminates with traditional reinforcements in the form of mats and/or woven roving with equal strength and stiffness properties in both hoop and longitudinal directions. Prior art joints are designed so as to be able to withstand the design loads in both hoop and longitudinal direction, independent of the pipe itself, thus disregarding important aspects like the pipe's load carrying capacity in the hoop direction and stress concentrations generated by discontinuity.

The minimum bond length (the longitudinal dimension of the laminates on each pipe end) is typically determined based on simplified models for shear stress distribution in the bonding surface between the pipe and the laminate. In fact, the bond length is normally determined such that the average shear stress over the bonding surface shall not exceed a fixed value, independent of the real shear stress distribution and how it is influenced by factors like the stiffness ratio between pipe and wraps, absolute bond length, geometric and elastic properties and stress concentrations. Radial stresses and their influence on bonding strength as well as discontinuity stresses are commonly disregarded.

As a consequence, the butt-wraps currently in use tend to be overly thick and rigid giving rise to severe stress concentrations in the pipes joined, negatively affecting their performance. The simplified models for lap shear strength do in many cases correlate poorly to the real strength, which may lead to either overly conservative and costly butt-wraps, or—in the worst cases—to underdesign.

It is therefore a long felt need for an improved butt-wrap joint for reinforced plastic pipes, that have optimal design characterisics and is less time consuming and less costly to produce.

The present invention solves that need, in that it provides a novel butt-wrap joint for fiber reinforced thermosetting resin pipes, said joint being structurally and economically improved compared to the prior art. In this regard, the main focus is on improved structural reliability of the joint, increased load carrying capacity, improved utilisation of the pipes structural capacity through reduction of stress concentrations and reduced cost of the joint.

BRIEF SUMMARY OF CERTAIN INVENTIVE ASPECTS

The above objective is attained by the aid of thorough structural analysis of the pipe together with the wraps and the use of efficient reinforcement fabrics and resins for the wraps.

Structural analyses and tests performed by the applicant have revealed that the longitudinal loading capacity of the butt-wrap joint, rather than the hoop strength, is the critical design factor. In that context, it is apparent the shear- and radial stress concentrations occurring in the bonding surfaces at the end of the pipe and the wraps, as well as the longitudinal stress concentrations acting in the pipe wall adjacent to the wraps, are the most important load responses that have to be controlled by proper design of the wraps.

The structural analyses and testing have also shown that the bonding stress concentrations are most efficiently controlled by:

1) balancing of the longitudinal stiffness of the wraps against the longitudinal stiffness of the pipe,
2) tapering of the wraps and/or the pipe spigot, and
3) optimizing the geometric-elastic properties of the wraps and the pipe.

Referring to step 2 above, a tapering of the spigot is highly impractical and will normally not be performed, unless specific conditions (e.g. unbalanced laminate) require it. A much more efficient approach is to displace the shear stress to the laminate edge by increasing the laminate longitudinal stiffness.

The radial stresses are most efficiently controlled by minimising the eccentricity of the wraps in the longitudinal direction. The longitudinal stress concentrations in the pipe are, on the other hand, most efficiently reduced by smooth tapering of the wraps and by minimising the hoop stiffness of the wraps.

The structural capacity and efficiency of butt-wrap joints can also be increased by correct choice of resin and reinforcement. Resins with better adhesion will allow for higher shear and radial stress concentrations in the bonding surface. Because of the limitations of secondary bonding strength compared to the strength of cured in one resin, it is under most circumstances beneficial to use a higher quality resin in the wraps than in the pipes.

Non-woven fiber reinforcements are also beneficial compared to woven reinforcements. With straight fibers the radial stress, generated when the undulated fiber of woven roving are tensioned, are avoided and with the higher degrees of reinforcement achieved, curing stresses are reduced.

The butt-wrap joint according to the invention generally comprises a plurality of wraps of material wetted with a thermosetting resin and wrapped circumferentially relative to a first pipe end and a second pipe end, where the first and second pipe ends are the respective ends of first and second pipes. The pipes are aligned and the two pipe ends are abutting. The pipes are being joined at their respective abutting ends by the wraps disposed generally symmetrically on said abutting pipes. The first wrap is disposed relative to the respective pipes and second through n-th wrap are disposed successively outwardly, relative of the respective preceding wrap. The first wrap has a width $L_1$, the second wrap has a width $L_2$, and the n-th wrap has a width $L_n$, all in in the pipe longitudinal direction. The wraps are covered by a chopped strand mat (CSM) wetted with the thermosetting resin and having a width $L_0$ in the pipe longitudinal direction. The butt-wrap joint in accordance with the invention is is thus characterised in that:

a first wrap width $L_1$ is greater than the width of any of the subsequent wraps;

a second wrap width $L_2$ is greater than the width of any of the subsequent wraps;

the widths $L_3$ to $L_{n-1}$ of the intermediate wraps are successively diminishing at a constant rate $(2\gamma)$, where this rate is a result of a linear interpolation between the second wrap $L_2$ width and the n-th wrap width $L_n$;

the longitudinal stiffness ($E_{long} \times t$) of the wraps is progressively tapered at the edges, in that the longitudinal stiffness of the wraps is increased at a low rate (wrap stiffness vs distance from wrap edge) at the edge of the wraps while it is increased at a faster rate away from the edge.

Preferred embodiments of the invention are that: The rate of increase in wrap stiffness is preferably increased in 3 or more steps. The variable n may be any number greater than or equal to 3. The laminate has a substantially higher tensile stiffness in the longitudinal direction than in the circumferential direction. As each of the wraps has a tensile stiffness in the longitudinal direction which is substantially (e.g. 50%–200%) higher than the tensile stiffness in the circumferential direction, and said chopped strand mat (CSM) has generally uniform tensile stiffness in both the longitudinal and circumferential directions, the resulting laminate has a tensile stiffness in the longitudinal direction which is substantially higher than the tensile stiffness in the circumferential direction. The resin is a vinylester resin, or (preferably) a bisphenol A vinylester resin. The butt-wrap resin may be a vinyl ester while the pipe resin is a polyester. The butt-wrap resin and the pipe resin may be different resins. The butt-wrap resin may have a higher quality than the pipe resin.

The longitudinal tensile stiffness of the laminate is greater than longitudinal tensile stiffness of the pipes. The wraps are comprised of non-woven roving fabric. The wraps are disposed externally relative to said pipes. The wraps are disposed internally relative to said pipes. The wraps are disposed both externally and internally relative to said pipes. The resin is in a cured (or set) state and/or in a non-cured (or set) state. The pipes are comprised of glass fibre reinforced plastic, carbon fibre reinforced plastic, or other types of fibres.

BRIEF DESCRIPTION OF THE DRAWINGS

FIG. 2a is a diagrammatic illustration of the general build-up of the laminate with n wraps, and indicates the various wraps and their relationship relative to each other and the pipe surface.

FIG. 2b is a diagrammatic illustration similar to that of FIG. 2a, for a specific embodiment of four wraps (n=4).

FIG. 4 is a schematic cross section of a part of the joint in FIG. 3a, taken along the section line A—A.

DETAILED DESCRIPTION OF CERTAIN EMBODIMENTS OF THE INVENTION

The invention will now be described with reference to the accompanying drawings (FIGS. 1–5), where like items are identified by respective reference numbers.

Figure 1:
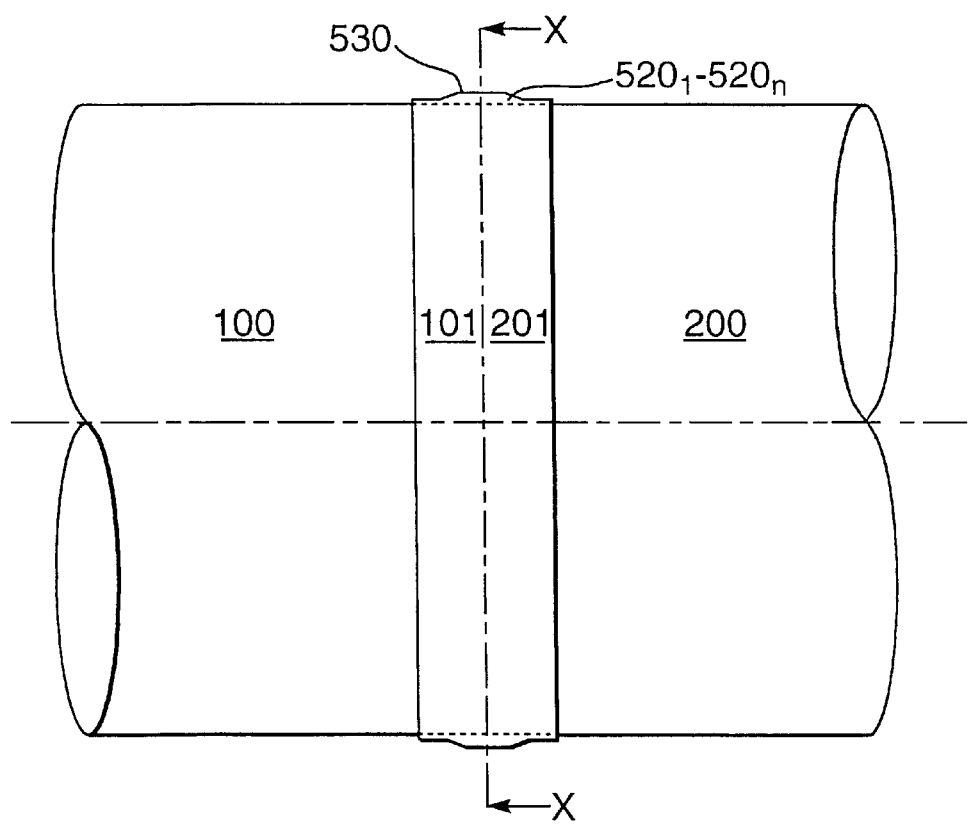
FIG. 1 is a side view of a butt-wrap joint.

FIG. 1 shows a butt wrap joint made up of two aligned pipes 100, 200 with respective abutting pipe ends 101, 201 (shown by dotted lines). The pipe ends are wrapped with a number of layers (or wraps) $520_1$–$520_n$ (shown by dotted lines) of a material wetted with a thermosetting resin and covered by a chopped strand mat (CSM) 530, also wetted with a thermosetting resin.

FIG. 2a is a diagrammatic (and exploded) illustration of the general build-up of a laminate made up of n wraps, and shows, in ascending order from the pipe surface 100, 101, 200, 201 (only one side of pipes shown, pipes partly shown):

First wrap $520_1$ having a width $L_1$ in the pipe longitudinal direction;

Second wrap $520_2$ having a width $L_2$ in the pipe longitudinal direction;

Third wrap $520_3$ having a width $L_3$ in the pipe longitudinal direction;

n-th wrap $520_n$ having a width $L_n$ in the pipe longitudinal direction;

Chopped strand mat (CSM) 530 having a width $L_0$ in the pipe longitudinal direction, FIG. 2b is an illustration similar to that of FIG. 2a, for an embodiment where n=4.

The figures show how the wraps are disposed symmetrically relative to the pipe ends and that $L_0 > L_1 > L_2 > L_3 > L_n$. Furthermore, $L_0 - L_1 = 2\alpha$ and $L_1 - L_2 = 2\beta$. The wraps $520_2$ through $520_n$ have corresponding widths $L_2$ through $L_n$ that diminish successively at a constant rate $2\gamma$, as a result of a linear interpolation between $L_2$ and $L_n$. The wrap longitudinal stiffness ($E_{long} \times t$) is consequently progressively tapered at the edges, in that the longitudinal stiffness of the wraps is increased at a low rate (wrap stiffness vs distance from wrap edge) at the edge of the wraps while it is increased at a faster rate away from the edge, i.e. $(E_{long}(530) \times t(530))/\alpha < E_{long}(520_1) \times t(520_1)/\beta < E_{long}(520_i) \times t(520_i)/\gamma$ $(2 \leq i \leq n)$ where $E_{long}(XXX)$ is the longitudinal E-modulus of wrap no. XXX and t(XXX) is its thickness. The rate of wrap stiffness increase is preferably increased in 3 or more steps.

Figure 3A:
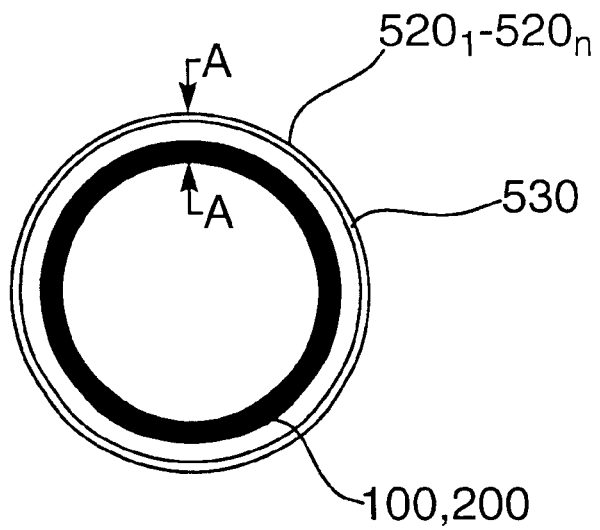
FIG. 3a shows a cross section through an unbalanced (i.e. external) joint, according to an embodiment of the present invention, as seen in the pipe longitudinal direction, e.g. taken along the section line X—X in FIG. 1. The wrap thicknesses are shown as being comparatively larger than the pipe cross-section, for clarity of illustration.
Figure 3B:
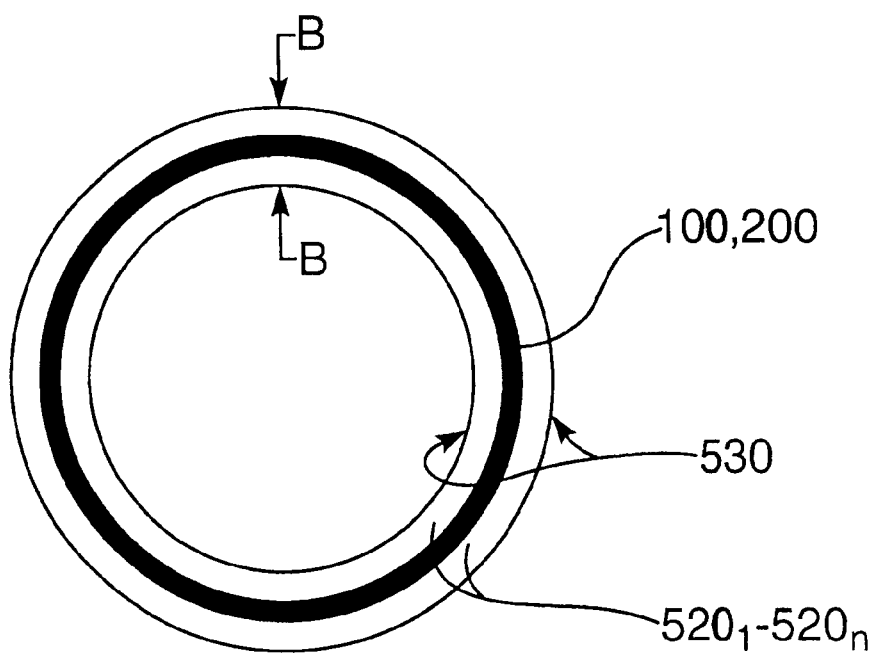
FIG. 3b shows a-cross section through a balanced (i.e. external and internal) joint, according to an embodiment of the present invention, as seen in the pipe longitudinal direction, e.g. taken along the section line X—X in FIG. 1. The wrap thicknesses are shown as being comparatively larger than the pipe cross-section, for clarity of illustration.
Figure 5:
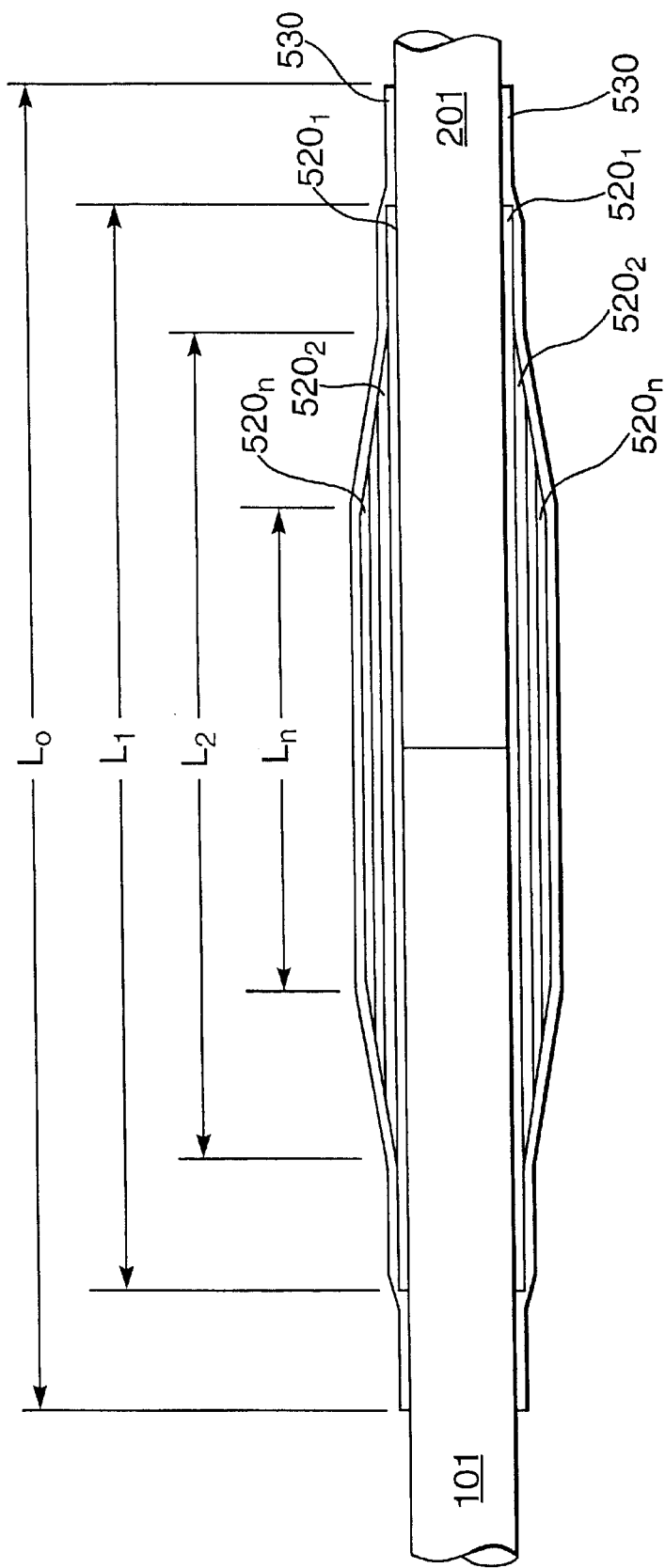
FIG. 5 is a schematic a cross section of a part of the joint in FIG. 3b, taken along the section line B–B.

FIGS. 3a and 4 illustrate the finished joint which consists of an external laminate only, while FIGS. 3b and 5 illustrate a finished joint consisting of both an internal and an external laminate.

An embodiment of the invention will now be described with reference to the accompanying drawings. A butt wrap joint of two glassfibre reinforced polyester resin pipes is made. The pipes have nominal diameter (DN) ranging from 300 mm to 4000 mm and are in pressure classes PN1–PN32 and stiffness classes SN1250 Pa to SN10000 Pa. The pipes have square spigot ends that are placed against each other.

The pipes are jointed by building up an internal and an external wrap covering the pipe spigots. The wraps are made by means of a laminating process.

The wraps are built up utilising 800 g/m² non-woven triaxial glassfibre roving fabric and 450 g/m² chopped strand mat, CSM, wetted with bisphenol A vinylester resin.

The roving fabric is composed of 3 layers of rovings. The rovings of the first layer, weighing 50% of the total weight of the fabric, are oriented in the longitudinal direction of the pipe while the rovings in the remaining two layers, weighing 25% each, are oriented +/-45° relative to the rovings of the first layer.

Each wrap is made by first laminating a first roving fabric $520_1$ with a width $L_1$, over the pipe spigots followed by roving fabrics $520_2$–$520_n$ of widths $L_2$–$L_n$ Finally, the wrap is covered by a chopped strand mat (CSM) 530 of width $L_0$. All of the layers are placed symmetrically relative to the pipe joint.

In the following, typical examples of appropriate numbers of wraps and lengths are given for various pipe sizes (DN) and classes, (PN and SN).

Standard uniaxial Flowtite pipe, DN600, PN6, SN2500: n=3, $L_n$=83 mm, $L_2$=100 mm, $L_1$=150 mm, $L_0$=200 mm Standard uniaxial Flowtite pipe, DN2000, PN10, SN5000: n=8, $L_n$=150 mm, $L_2$=250 mm, $L_1$=300 mm, $L_0$=350 mm Standard uniaxial Flowtite pipe, DN1000, PN20, SN10000: n=6, $L_n$=117 mm, $L_2$=183 mm, $L_1$=233 mm, $L_0$=283 mm.

The performance of a DN600, PN10 biaxial Flowtite pipe joint (n=4, $L_n$=64 mm, $L_2$=100 mm, $L_1$=150 mm, $L_0$=200 mm) has been demonstrated through several full scale tests where two pipe sections have been jointed as described. The pipe joint assembly has then been blinded in both ends, filled with water and pressurised. In a short term burst test with free end configuration according to ASTM D1599 (the joint has to carry the full pressure load in both circumferential and longitudinal direction), a burst pressure of 60 bar has been demonstrated. In a long term pressure testing with free end configuration according to ASDM D1598 two joint assemblies have been standing under a pressure of 33 and 34 bar respectively for 8000 hours and 4000 hours respectively, without failure.

The laminate has a tensile stiffness in the longitudinal direction which is more than two times higher than the tensile stiffness in the circumferential direction. The laminate has a tensile stiffness which is more than 30% greater than the stiffness of the joined pipes.

While the above embodiment has been described with reference to fiberglass reinforced pipes (GRP), the invented joint is equally applicable for joining pipes reinforced with other types of fibres.

The foregoing description and the embodiments of the present invention are to be construed as mere illustrations of the application of the principles of the invention. The foregoing is not intended to limit the scope of the claims, but the true spirit and scope of present invention is defined by the claims.

What is claimed is:

1. A butt-wrap joint for joining fiber reinforced thermosetting resin pipes, comprising:

a plurality of wraps of material wetted with a thermosetting resin and wrapped circumferentially relative to a first pipe end and a second pipe end, said first and second pipe ends being the respective ends of first and second pipes;

said pipes being aligned and said first pipe end abutting said second pipe end;

said first and second pipes being joined at their respective abutting ends by said plurality of wraps disposed generally symmetrically on said abutting pipes;

a first wrap being disposed relative to the surface of said respective pipes and a second through an n-th wrap of said plurality of wraps being successively disposed outwardly, relative of a respective preceding wrap;

said first wrap having a width $L_1$ in the pipe longitudinal direction;

said second wrap having a width $L_2$ in the pipe longitudinal direction;

said n-th wrap having a width $L_n$ in the pipe longitudinal direction; and said plurality of wraps being covered by a chopped strand mat wetted with said thermosetting resin and having a width $L_0$ in the pipe longitudinal direction, wherein:

said first wrap width $L_1$ being greater than the width of any of the subsequent wraps;

said second wrap width $L_2$ being greater than the width of any of the subsequent wraps;

the widths $L_3$ to $L_{n-1}$ of the intermediate wraps being successively diminishing at a constant rate, said rate being a result of a linear interpolation between she second wrap $L_2$ width and the n-th wrap width $L_n$;

the longitudinal stiffness of the wraps is progressively tapered at the edges, in that the longitudinal stiffness of the wraps is increased at a low rate at the edge of the wraps while it is increased at a faster rate away from the edge.

2. The butt-wrap joint in accordance with claim 1, wherein the rate of increase in wrap stiffness is increased in 3 or more steps.

3. The butt-wrap joint in accordance with claim 1, wherein n is any number greater than or equal to 3.

4. The butt-wrap joint in accordance with claim 1, wherein a laminate of said plurality of wraps has a substantially higher tensile stiffness in the longitudinal direction than in the circumferential direction.

5. The butt-wrap joint in accordance with claim 1, each of said wraps having a tensile stiffness in the longitudinal direction which is substantially higher than the tensile stiffness In the circumferential direction, and said chopped strand mat having generally uniform tensile stiffness in both the longitudinal and circumferential directions, wherein a resulting laminate of said plurality of wraps has a tensile stiffness in the longitudinal direction which is substantially higher than the tensile stiffness in the circumferential direction.

6. The butt-wrap joint in accordance with claim 1, wherein said resin is a vinylester resin.

7. The butt-wrap joint in accordance with claim 6, wherein said butt-wrap resin is a vinyl ester while the pipe resin is a polyester.

8. The butt-wrap joint in accordance with claim 7, wherein said butt-wrap resin is of a first material and said pipe resin is of a second material.

9. The butt-wrap joint in accordance with claim 1, wherein said resin is a bisphenol A vinylester resin.

10. The butt-wrap joint in accordance with claim 1, wherein the longitudinal tensile stiffness of the laminate is greater than longitudinal tensile stiffness of the pipes.

11. The butt-wrap joint in accordance with claim 1, wherein said wraps are comprised of non-woven roving fabric.

12. The butt-wrap joint in accordance with claim 1, wherein said wraps are disposed externally relative to said pipes.

13. The butt-wrap joint in accordance with claim 1, wherein said wraps are disposed internally relative to said pipes.

14. The butt-wrap joint in accordance with claim 1, wherein said wraps are disposed both externally and internally relative to said pipes.

15. The butt-wrap joint in accordance with claim 1, wherein said resin is in a cured state.

16. The butt-wrap joint in accordance with claim 1, wherein said resin is in a non-cured state.

17. The butt-wrap joint in accordance with claim 1, wherein said pipes are comprised of glass fibre reinforced plastic.

18. The butt-wrap joint in accordance with claim 1, wherein said pipes are comprised of carbon fibre reinforced plastic.

19. The butt-wrap joint of claim 5, wherein the tensile stiffness of each of said wraps is 50% to 200% higher in the longitudinal direction than in the circumferential direction.

* * * * *